Patented July 28, 1953

2,647,076

UNITED STATES PATENT OFFICE 2,647,076

CATALYTIC CRACKING OF PETROLEUM HYDROCARBONS WITH A CLAY TREATED CATALYST

John Norman Haresnape and Frederick William Bertram Porter, Sunbury-on-Thames, England, assignors to Anglo-Iranian Oil Company Limited, London, England, a British joint-stock corporation No Drawing. Application January 8, 1948, Serial No. 1,274. In Great Britain January 10, 1947

6 Claims. (Cl. 196—52)

This invention relates to the catalytic cracking of petroleum hydrocarbons.

The catalytic cracking of higher boiling petroleum fractions for the production of gasoline and gas-oil is well known, and catalysts commonly employed for such cracking operations include artificially prepared mixed silica-alumina gel, either in the form of granules or pellets, or, as in the fluid catalytic cracking process, in the form of a fine powder, and the so-called "natural" catalyst being usually a montmorillonite clay of fairly high purity which has been leached with mineral acid to enhance its catalytic activity. The process has been applied successfully to a wide variety of feedstocks boiling in the gas-oil range and above. When gas-oil is cracked, gasoline is recovered as a desirable product, while when a feedstock boiling above the gas-oil range is cracked, both gasoline and gas-oil are recovered as desirable products.

The process as normally carried out suffers from the following disadvantages. The gasoline produced is highly unsaturated and, even when treated by the addition of inhibitors thereto, tends to be unstable and to deposit objectionable gummy materials on storage, so that it cannot be used to any large extent in high quality aviation fuels. Again, if the feedstock submitted to catalytic cracking has a high sulphur content, so that only a small increase in the octane number is observed on the addition of tetra-ethyl lead, expensive refining treatment is necessary before any considerable lead response can be obtained. Similarly, if gas-oil is produced in the cracking operation, it also is highly unsaturated and unstable, has a comparatively low cetane number, and a high sulphur content if derived from a feedstock having a high sulphur content, so that it is of little use as a fuel for internal combustion engines.

According to the process of the invention, it is possible to obtain by the catalytic cracking of sulphur-containing feedstocks, even of the most highly sulphurous feedstocks, a gasoline of very low olefine and sulphur contents (and hence of high stability and high lead response and therefore eminently suitable for inclusion in aviation spirit), and a gas-oil also of low olefine and sulphur contents, and of improved cetane number, and which therefore has a much enhanced value as a diesel fuel.

The process of the invention comprises cracking a sulphur-containing petroleum feedstock boiling in the gas-oil range or higher in the presence of a catalyst as hereinafter defined, and utilising hydrogen-containing gaseous products of the cracking operation, either as such, or after treatment in known manner to increase their content of hydrogen, to hydrogenate the olefinic constituents and the sulphur compounds contained in any or all of the liquid products of the cracking operation.

It is essential that the cracking operation be carried out in the presence of a catalyst having high hydrogen-producing activity and suitable catalysts for the purpose are montmorillonite clays which have been heated to remove at least part of the combined hydroxyl groups. The hydrogen content of the cracked gas obtained in the use of such catalyst is sufficiently large to enable the gas to be used in the hydrogenation step without further treatment.

Montmorillonite may be represented by the approximate formula $Al_2O_3.H_2O.4SiO_2.xH_2O$, with the $Al_2O_3$ partially replaced by iron oxide, magnesium oxide, sodium oxide and the like, and the effect of heating is first to eliminate the $x$ molecules of water at a temperature of 100–200° C., and thereafter the combined hydroxyl groups at a much higher temperature. A more accurate formula is $Al_2Si_4O_{10}(OH)_2.xH_2O$, with the aluminium atoms partially replaced by other atoms such as iron, magnesium and sodium. We have found that the temperature which it is necessary to heat the clay to initiate the loss of the combined hydroxyl groups lies within the range 500–700° C. depending upon the content of certain impurities, notably iron and sodium. For example, montmorillonites having a high content of iron and/or sodium dehydrate near the lower limit of this range, while those having a low content of iron and/or sodium dehydrate near the upper limit of the range. As a general rule, those montmorillonites having more than 7% iron oxide will be substantially completely dehydrated at temperatures around 500° C., while those with less than 1.5% iron oxide, only at temperatures approaching 700° C.

The combined hydroxyl groups may be removed from a part or all of the catalyst, since the dehydrogenation type of activity begins to appear as soon as the loss of the combined hydroxyl groups commences. In practice, it is improbable that the mineral is completely dehydrated in heating to the determined temperature.

The activity of the catalysts used according to the present invention as dehydrogenation catalysts tends to declined if they become rehydrated either prior to use as a catalyst, or at some stage in the catalytic cracking process, as for instance by exposure to steam at high temperature. According to a further feature of the invention, such decline may be prevented or reduced by use of the catalyst, which has been treated, while in the dehydrated state, with hydrogen sulphide at a temperature of about 850° F. It is possible that the hydrogen sulphide molecules enter into the structure of the montmorillonite in substitution for the water removed on dehydration. The necessary treatment with hydrogen sulphide may be effected by using the dehydrated catalyst, before it has had an opportunity of becoming rehydrated, to crack a feedstock containing sulphur whereby hydrogen sulphide is liberated as the cracking reaction proceeds. On the other hand, the dehydrated catalyst may be treated with hydrogen sulphide in a separate operation prior to being used as a cracking catalyst.

We have also found that an acid treated montmorillonite catalyst of low iron content, which has lost a large part of its activity for catalytic cracking, may be converted into a stable catalyst for use according to the present invention simply by heating to a temperature sufficient to dehydrate the catalyst completely. Such application of the invention is of particular advantage inasmuch as spent montmorillonite cracking catalysts, which would normally be discarded, may be converted into valuable catalysts according to the present invention.

Thus, one example of a catalyst for use according to the invention is a fuller's earth, having the analysis (a) in Table I below, which, after acid treatment had the analysis (b) as set out in Table I. This material requires heating to 500° C. only, for dehydration to take place and the desired type of activity to be developed. Another example is a bentonite (consisting essentially of montmorillonite) having the analysis (c) as set out in Table I which after acid treatment had the analysis (d) as set out in Table I. This material requires heating to a temperature of 650°–700° C. before developing the desired type of activity:

Table I

| Constituent | | a | b | c | d |
|---|---|---|---|---|---|
| $SiO_2$ | Percent Wt | 61.0 | 64.7 | 50.5 | 50.2 |
| $Al_2O_3$ | do | 14.9 | 11.7 | 17.0 | 8.2 |
| $Fe_2O_3+FeO$ | do | 8.2 | 5.6 | 1.1 | 0.4 |
| CaO | do | 2.4 | 4.1 | 4.2 | 1.9 |
| MgO | do | 3.8 | 3.9 | 5.4 | 0.9 |
| $H_2O$ | do | 5.9 | 5.3 | 23.8 | 35.5 |

Using a catalyst as hereinbefore defined and with equal conversion of the feedstock to lower boiling products, the make of gas may be more than doubled in volume, the whole of the increase being represented by an increase in the amount of hydrogen produced. Thus, by cracking a wax distillate, boiling in the range 650°–900° F., and representing the portion obtained between 68.6 and 79.0% wt. in the fractional distillation of Iranian crude oil, on a synthetic silica-alumina catalyst or on a natural catalyst which is not dehydrated, the product which is gaseous at −40° C. contains less than 25% hydrogen, whereas by cracking the same wax distillate on the dehydrated catalyst according to the invention, the gaseous product contains more than 40% hydrogen under a wide variety of conditions and may contain as much as 80% hydrogen; and whereas on the former catalysts, the hydrogen produced does not exceed 150 cu. ft./bbl. of feedstock processed, on the dehydrated catalyst according to the invention it may be as high as 680 cu. ft./bbl. In a similar conversion of feedstock to lower boiling products, the conversion to gasoline is rather lower, and that to gas-oil rather higher, when using the dehydrated catalyst according to the invention.

In the process of the invention the gasoline contains a larger proportion of the less volatile components and the decrease is almost entirely confined to the fractions boiling below 100° C. This may be an advantage in any refinery where the more volatile hydrocarbons are in excess of requirements for balanced production. The octane number of the gasoline and the quality of the gas-oil are similar to those of the products obtained on undehydrated natural catalysts. Under comparable conditions of temperature, contact time and the like, the conversion of feedstock to lower boiling hydrocarbons is rather less than on a synthetic silica-alumina catalyst or on a undehydrated natural clay catalyst, but this can be compensated for in a continuous unit by operting both the reaction and regeneration steps at a higher temperature, since with the type of catalyst used according to the invention it is not necessary to limit so severely the maximum temperature to which it is subjected, in order to present decrease in the activity of the catalyst.

The analysis of three typical gas mixtures (a), (b) and (c) obtained by the cracking of the above defined wax distillate in accordance with the process of the invention are given in Table II below.

Table II

| Constituent | a | b | c |
|---|---|---|---|
| $H_2$ | 63.0 | 70.0 | 77.1 |
| $CH_4$ | 13.0 | 9.3 | 7.2 |
| $C_2H_4$ | 4.3 | 3.6 | 1.9 |
| $C_2H_6$ | 7.1 | 5.3 | 3.7 |
| $C_3H_6$ | 3.9 | 2.9 | 2.4 |
| $C_3H_8$ | 3.2 | 2.9 | 2.2 |
| $C_4H_8$ | 2.1 | 3.9 | 3.1 |
| $C_4H_{10}$ | 1.2 | | |
| $C_5+$ | 1.8 | 1.5 | 1.8 |
| $H_2S$ | 0.4 | 0.6 | 0.6 |

For many purposes these gases are sufficiently rich in hydrogen for use as produced, but may be further purified by any known method.

The invention will be described hereinafter with reference to a feedstock consisting of a waxy distillate of Iranian origin which gives rise to both a gasoline and a gas-oil product on catalytic cracking, but it is to be understood that it can equally well be applied to a lower boiling feedstock which gives only a gasoline liquid product.

In carrying the invention into effect according to one method of operation, the crude products from the catalytic cracking operation are separated by distillation into two fractions, viz. (a) a distillate fraction, consisting of the gaseous portion of the product and that portion of the liquid product boiling below about 740° F., and (b) a residue boiling above about 740° F. The portion (a) is passed over a sulphur-resistant hydrogenating catalyst under conditions such that the saturation of olefines and elimination of sulphur takes place, and the hydrogenated product is separated into a gaseous fraction, a gasoline fraction, and a gas oil fraction. If required, the fraction (a) may be further separated before passing to the hydrogenation stage, into a liquid and a gaseous portion and the gaseous portion may be treated in known manner (as for instance, by scrubbing with a hydrocarbon oil) to decrease its content of gases other than hydrogen, before being used to hydrogenate the liquid portion of the fraction (a): and the gaseous fraction from the product leaving the hydrogenation stage may be recycled to the hydrogenation stage either with or without a similar treatment to increase its concentration of hydrogen. Further, if desired, the liquid portion of the fraction (a) may be separated into two or more fractions, representing for example, a gasoline and a gas-oil, and either or both of these separately subjected with an appropriate portion of the gaseous product, to the hydrogenation step, by which means it is possible to hydrogenate each fraction under the ideal conditions for its treatment.

The desulphurisation catalyst may be any of the known sulphur-resistant hydrogenating catalysts such as the oxides and sulphides of iron, nickel, cobalt, chromium, molybdenum, copper, manganese and tungsten, metals such as sodium, potassium, lithium, calcium, zinc, aluminum, manganese, iron, nickel, cobalt or copper, or compounds such as molybdates, thiomolybdates, thiotungstates, or aluminates of metals of the 6th group, either alone, or in combination with other catalysts, but a catalyst consisting of cobalt molybdate deposited on activated alumina is preferred. When using this catalyst we prefer to operate at a pressure in the range 500–1500 p. s. i. g. and at a temperature of 700°–800° F. The use of low temperatures and high pressures in the hydrogenation stage favours desulphurisation, and under the conditions disclosed the aromatic content of the cracked products is not hydrogenated. The catalytic cracking stage can be accomplished in any of the known types of plant employing, for example, a fixed catalyst bed periodically regenerated in situ by discontinuing the feed and passing air or diluted air, over the catalyst, or alternatively a fluid bed with circulation of catalyst between reactor and regenerator and therefore, with continuous operation.

The following is an example of the process of the invention carried out in the use of a fixed cracking catalyst bed.

The feedstock is a waxy distillate representing the portion obtained between 68.6% and 79.0% wt. in the distillation of an Iranian crude oil. It has 20% by volume distilling below 770° F., a specific gravity at 140° F. of 0.8770, and a sulphur content of 1.50% wt. This feedstock is subjected to catalytic cracking over a catalyst consisting of pellets of a montmorillonite clay previously activated by treatment with sulphuric acid, and heated to a temperature of 1200° F., at which temperature the combined water is driven off. The feed rate to the cracking stage is 0.9 volumes of oil per volume of catalyst per hour, the temperature 950° F. and the pressure is atmospheric. The cracked product is fractionated into a distillate fraction of end point about 740° F., and a residue fraction. The distillate fraction constitutes 54% wt. on the feedstock, the residue fraction 41% wt. on the feedstock and the remaining 5% is deposited as carbon and the like, on the catalyst. The distillate fraction is passed to a hydrogenation stage wherein it is contacted with a catalyst consisting of circa 10% of cobalt molybdate on alumina. The temperature in this stage is 750° F., pressure 1000 p. s. i. g. and the throughput 3 lb./lb. of catalyst/hour. The product is separated by cooling into a liquid and a gaseous fraction, the liquid fraction further separated by fractionation into a gasoline fraction of boiling range to 430° F., constituting 44.5% wt. of the said liquid product and circa 20% wt. on the waxy distillate feedstock, and a gas oil fraction of boiling range 430°–740° F., constituting 55.5% wt. on the said liquid product, and circa 25% on the feedstock.

The gasoline, after stabilisation to a vapour pressure (Reid) of 10 p. s. i. g. and removal of dissolved hydrogen sulphide (in known manner) has a sulphur content less than 0.001% wt., a bromine number of less than 1 and an octane number of 77 (A. S. T. M. Motor Method), which becomes 96 on the addition of 4 ml. of tetraethyl lead per gallon. The corresponding gasoline fraction before the hydrogenation step has a sulphur content of 0.1% wt. a bromine number of 109 and an octane number of 79 which becomes 96 on addition of 4 ml. of tetraethyl lead per gallon. The gas oil product has a sulphur content of 0.1% wt. an olefin content of 1% and a cetane number of 35, whereas the corresponding gas-oil fraction before the hydrogenation step has a sulphur content of 1.3% wt., an olefine content of 25% and a cetane number of 25.

We claim:

1. A catalytic cracking process which comprises cracking a sulphur-containing petroleum feedstock in the presence of a catalyst consisting essentially of a montmorillonite clay which has been heated to a temperature between about 500° C. and 700° C. to remove substantially completely the combined hydroxyl groups without causing any physical disruption of the clay, and from which clay, as it is employed in the cracking step, the combined hydroxyl groups are substantially completely absent, said temperature being in inverse relationship to the iron oxide content present in said clay such that when the iron oxide content is less than 1.5% the temperature will be about 700° C., and when the iron oxide content is more than 7%, the temperature will be about 500° C., separating from the cracked products a liquid fraction and a hydrogen-containing gaseous fraction, passing said liquid fraction and said hydrogen-containing gaseous fraction over a sulphur-resistant hydrogenation catalyst under conditions such that the saturation of olefines and the hydrogenation of sulphur compounds contained in said liquid fraction are effected, said hydrogen-containing gaseous fraction constituting the whole of the hydrogen supplied to the saturation-hydrogenation operation, and separating the hydrogenated products into a gaseous fraction and a desulphurized liquid fraction.

2. A catalytic cracking process which comprises cracking a sulphur-containing petroleum feedstock in the presence of a catalyst consisting essentially of a montmorillonite clay which has been heated to a temperature between about 500° C. and 700° C. to remove substantially completely the combined hydroxyl groups without causing any physical disruption of the clay, and from which clay, as it is employed in the cracking step, the combined hydroxyl groups are substantially completely absent, said temperature being in inverse relationship to the iron oxide content present in said clay such that when the iron oxide content is less than 1.5% the temperature will be about 700° C., and when the iron oxide content is more than 7%, the temperature will be about 500° C., separating the cracked product by distillation into a distillate fraction, consisting of the gaseous portion of the product and that portion of the liquid product boiling below about 740° F., and a residue boiling above about 740° F., passing the distillate fraction over a sulphur-resistant hydrogenation catalyst under conditions such that the saturation of the olefines and the hydrogenation of sulphur compounds contained in said distillate fraction are effected, said gaseous portion constituting the whole of the hydrogen supplied to the saturation-hydrogenation operation, and separating the hydrogenated product into a gaseous fraction, a desulphurized gasoline fraction and a desulphurized gas oil fraction.

3. A catalytic cracking process which comprises cracking a sulphur-containing petroleum feedstock in the presence of a catalyst consisting essentially of a montmorillonite clay which has been heated to a temperature between about 500° C. and 700° C. to remove substantially completely the combined hydroxyl groups without causing any physical disruption of the clay, and from which clay, as it is employed in the cracking step, the combined hydroxyl groups are substantially completely absent, said temperature being in inverse relationship to the iron oxide content present in said clay such that when the iron oxide content is less than 1.5% the temperature will be about 700° C., and when the iron oxide content is more than 7%, the temperature will be about 500° C., separating said distillate fraction into a gaseous fraction and a liquid fraction, treating the gaseous fraction to increase the concentration of hydrogen therein, passing the liquid fraction together with the treated gaseous fraction over a sulphur-resistant hydrogenation catalyst under conditions such that the saturation of olefines and the hydrogenation of sulphur compounds contained in said liquid fraction are effected, said treated gaseous fraction constituting the whole of the hydrogen supplied to the saturation-hydrogenation operation, and separating the hydrogenated product into a gaseous fraction, a desulphurized gasoline fraction and a desulphurized gas oil fraction.

4. A catalytic cracking process which comprises cracking a sulphur-containing petroleum feedstock in the presence of a catalyst consisting essentially of a montmorillonite clay which has been heated to a temperature between about 500° C. and 700° C. to remove substantially completely the combined hydroxyl groups without causing any physical disruption of the clay, and from which clay, as it is employed in the cracking step, the combined hydroxyl groups are substantially completely absent, said temperature being in inverse relationship to the iron oxide content present in said clay such that when the iron oxide content is less than 1.5% the temperature will be about 700° C., and when the iron oxide content is more than 7%, the temperature will be about 500° C., separating the said distillate fraction into a gaseous fraction, a gasoline fraction and a gas oil fraction, treating said gaseous fraction to increase the concentration of hydrogen therein, passing said gasoline fraction and said gas oil fraction together with portions of said gaseous fraction to separate hydrogenation zones wherein said fractions are treated in the presence of a sulphur-resistant hydrogenation catalyst under conditions such that the saturation of olefines and the hydrogenation of sulphur compounds contained in said fractions are effected, said treated gaseous fraction constituting the whole of the hydrogen supplied to said separate hydrogenation zones, separating the hydrogenated product from one of said hydrogenation zones into a gaseous fraction and a desulphurized gasoline fraction, and separating the hydrogenated product from the other of said hydrogenation zones into a gaseous fraction and a desulphurized gas oil fraction.

5. A catalytic cracking process which comprises cracking a sulphur-containing petroleum feedstock in the presence of a catalyst consisting essentially of a montmorillonite clay which has been heated to a temperature between about 500° C. and 700° C. to remove substantially completely the combined hydroxyl groups without causing any physical disruption of the clay, and from which clay, as it is employed in the cracking step, the combined hydroxyl groups are substantially completely absent, said temperature being in inverse relationship to the iron oxide content present in said clay such that when the iron oxide content is less than 1.5% the temperature will be about 700° C., and when the iron oxide content is more than 7%, the temperature will be about 500° C., separating the cracked product by distillation into a distillate fraction, consisting of the gaseous portion of the product and that portion of the liquid product boiling below about 740° F., and a residue boiling above about 740° F., passing said distillate fraction to a hydrogenation zone wherein said fraction is contacted with a sulphur-resistant hydrogenation catalyst under conditions such that the saturation of olefines and the hydrogenation of sulphur compounds contained in said distillate fraction are effected, said gaseous portion constituting the whole of the hydrogen supplied to said separate hydrogenation zone, separating the hydrogenated product into a gaseous fraction, a desulphurized gasoline fraction and a desulphurized gas oil fraction, and recycling said gaseous fraction to said hydrogenation zone.

6. A catalytic cracking process which comprises cracking a sulphur-containing petroleum feedstock in the presence of a catalyst consisting essentially of a montmorillonite clay which has been heated to a temperature between about 500° C. and 700° C. to remove substantially completely the combined hydroxyl groups without causing any physical disruption of the clay, and from which clay, as it is employed in the cracking step, the combined hydroxyl groups are substantially completely absent, said temperature being in inverse relationship to the iron oxide content present in said clay such that when the iron oxide content is less than 1.5% the temperature will be about 700° C., and when the iron oxide content is more than 7%, the temperature will be about 500° C., separating the cracked product by distillation into a distillate fraction boiling below about 740° F. and a residue boiling above about 740° F., separating the distillate fraction into a gas fraction, a gasoline fraction and a gas oil fraction, treating said gaseous fraction to increase the concentration of hydrogen therein, passing the thus-treated gas fraction together with said gasoline fraction and said gas oil fraction to separate hydrogenation zones wherein said fractions are contacted with a sulphur-resistant hydrogenation catalyst under conditions such that the saturation of olefines and the hydrogenation of sulphur compounds contained in said gasoline and gas oil fractions are effected, said treated gaseous fraction constituting the whole of the hydrogen supplied to said separate hydrogenation zones, separating the hydrogenated product from one of said hydrogenation zones into a gaseous fraction and a desulphurized gasoline fraction, separating the hydrogenated product from the other of said hydrogenation zones into a gaseous fraction and a desulphurized gas oil fraction, and recycling said gaseous fractions of said hydrogenation zones.

JOHN NORMAN HARESNAPE.
        FREDERICK WILLIAM
                BERTRAM PORTER.

References Cited in the file of this patent

UNITED STATES PATENTS

| Number | Name | Date |
|---|---|---|
| 2,271,617 | Benedict | Feb. 3, 1942 |
| 2,289,716 | Marschner | July 14, 1942 |
| 2,291,885 | Egloff | Aug. 4, 1942 |
| 2,292,677 | Thomas | Aug. 11, 1942 |
| 2,355,366 | Conn | Aug. 8, 1944 |
| 2,398,846 | Munday | Apr. 23, 1946 |
| 2,406,112 | Schulze | Aug. 20, 1946 |
| 2,432,822 | Secor | Dec. 17, 1947 |
| 2,526,700 | Shabaker | Oct. 24, 1950 |

OTHER REFERENCES

Evans: Oil and Gas Journal, vol. 44, pages 167, 168, 173, 177, 178, 181, 183, March 30, 1946.

Davidson: Petroleum Refiner, vol. 26, No. 9, pages 663–672, Sept. 1947.